United States Patent [19]

Axelrod

[11] Patent Number: 4,919,083
[45] Date of Patent: Apr. 24, 1990

[54] THROWABLE PET TOY

[76] Inventor: Herbert R. Axelrod, 211 W. Sylvania Ave., Neptune, N.J. 07753

[21] Appl. No.: 217,621

[22] Filed: Jul. 11, 1988

[51] Int. Cl.$^5$ ............................................. A01K 29/00
[52] U.S. Cl. .................................... 119/29; 119/29.5; 446/46; 273/424; D21/86
[58] Field of Search ...................... 446/46, 295; 119/29, 119/29.5; 273/424, 425; D21/2, 82, 85, 86; 525/104

[56] References Cited

U.S. PATENT DOCUMENTS

| 2,610,851 | 9/1952 | Jones | 119/29.5 |
| 3,724,122 | 4/1973 | Gillespie | 446/46 |
| 3,879,491 | 4/1975 | Lindsey et al. | 525/104 |
| 4,077,155 | 1/1978 | Bruntmyer | 446/46 |
| 4,246,720 | 1/1981 | Stone | 273/424 |

Primary Examiner—John Weiss
Attorney, Agent, or Firm—Fulwider Patton Reiber, Lee & Utecht

[57] ABSTRACT

An improved flying pet toy is formed of a suitable matrix material and an attractant for enhanced retrievability and wear resistance, including a circular crown portion having a center, an intermediate circular surface area surrounding the center, a circumferential portion surrounding the circular area. A projecting ridge extending outward from the top surface of the circular crown may also be included. Various other embodiments of the improved pet toy are also disclosed.

4 Claims, 3 Drawing Sheets

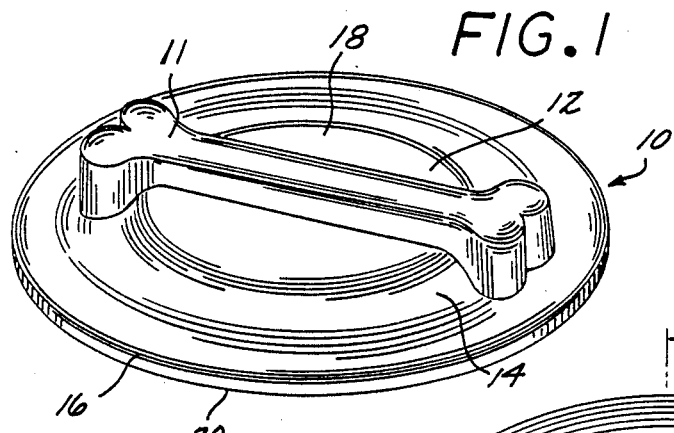
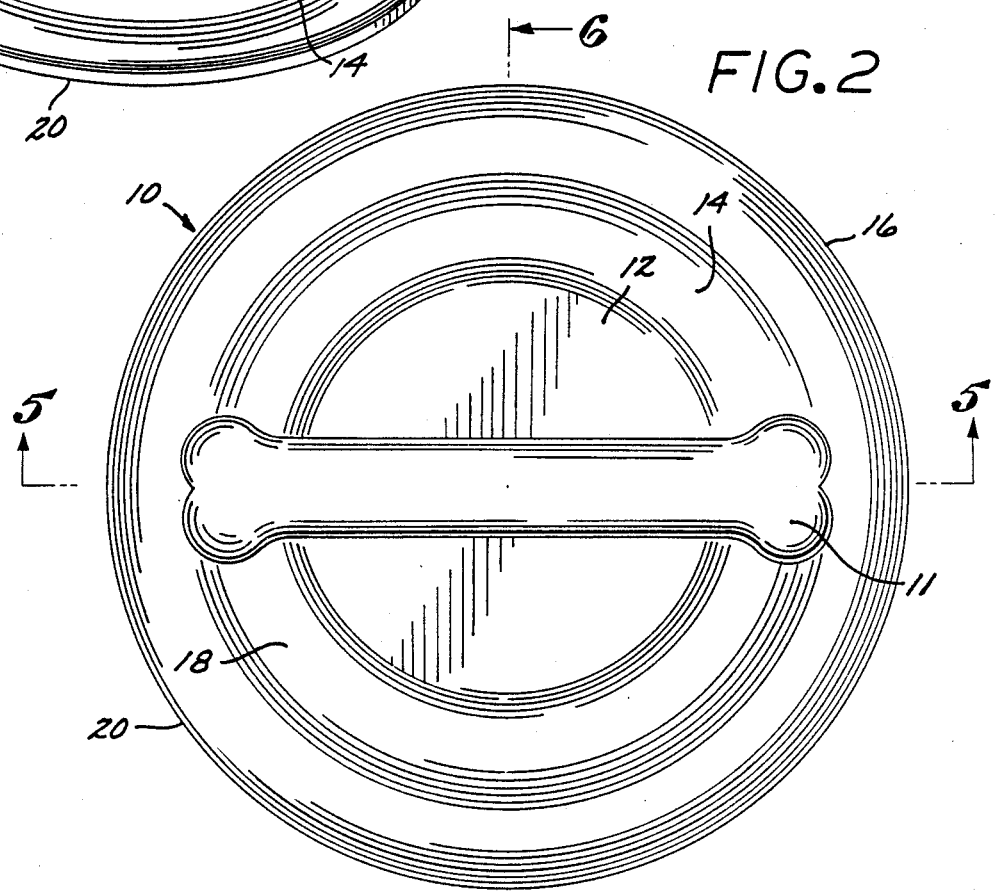
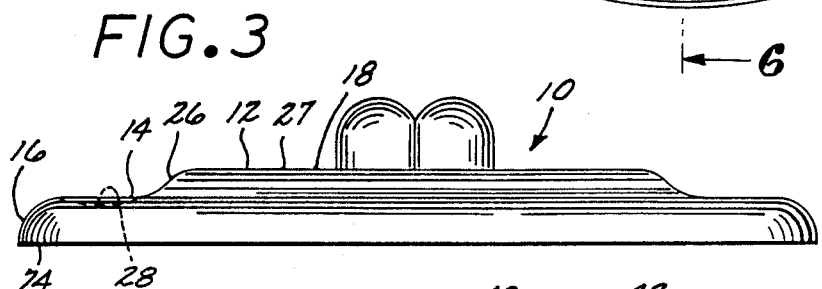
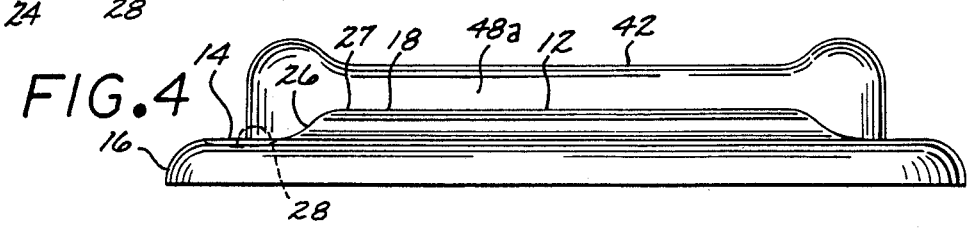

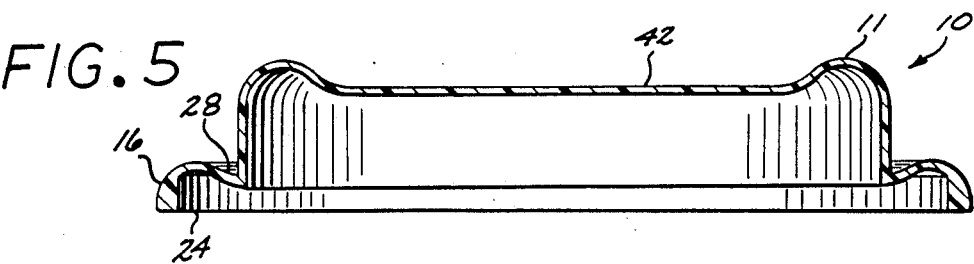
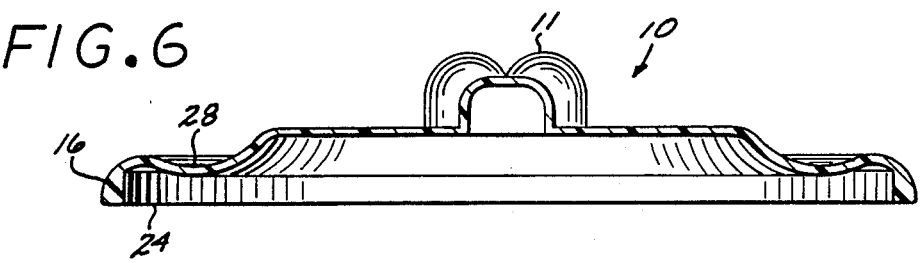
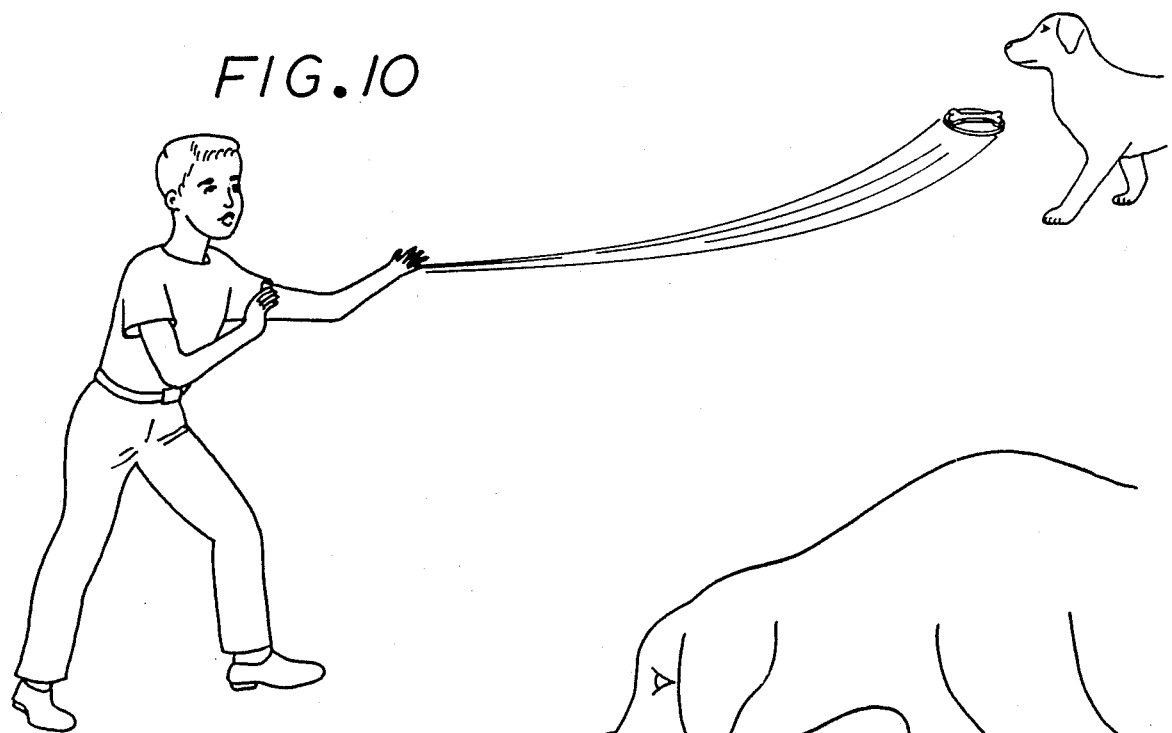
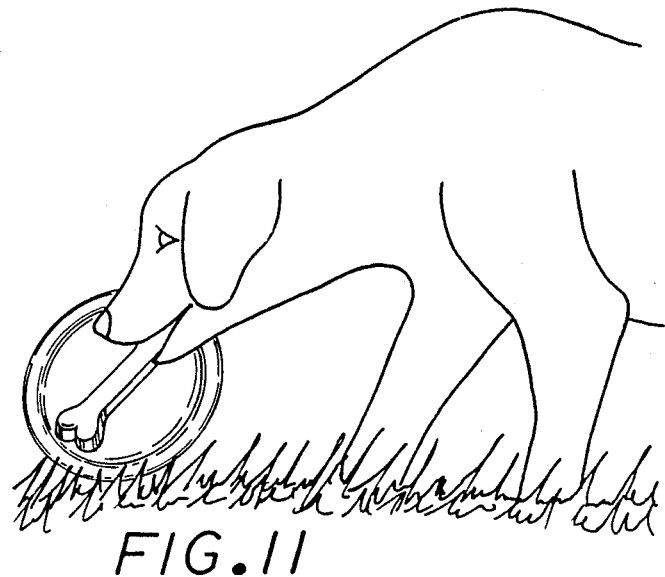

THROWABLE PET TOY

BACKGROUND OF THE INVENTION

FIELD OF THE INVENTION

This invention generally relates to pet toys and in particular to a throwable toy to be used by humans in throwing games with animals, particularly with dogs.

DESCRIPTION OF THE PRIOR ART

Throwable toys resembling inverted platters, saucers, or discs have enjoyed great popularity as recreational items for use in throwing games and contests. In the usual embodiment the throwable toy is made of a plastic material in a circular configuration with a rim portion located at its periphery, the rim portion being relatively thick in comparison to the remaining portions of the implement. In its normal inverted platter orientation, the rim curves downwardly from the toy body giving the implement a shape which approximates that of an airfoil when viewed in elevation. Such a toy has been marketed under the trademark "FRISBEE" by the Wham-o-Corp. of San Gabriel, California, the assignee of U.S. Pat. No. 3,724,122, issued Apr. 3, 1973.

In throwing games, the toy is normally grasped with the thumb on the convex side of the saucer and one or more of the fingers on the concave side. Throwing is accomplished with a wrist snapping motion wherein the thrower assumes a stance approximately at right angles to the intended target and retracts his arm across his body. By uncoiling his arm and snapping his wrist, momentum and spin is imparted to the saucer to cause it to fly or glide toward another participant in a game or in some cases toward an inanimate target. The intricacies of the flight path from the thrower depends upon the thrower's skill in selecting the proper release point and the angle of the saucer relative to the ground when it is released. Its appeal resides in the fact that it exhibits definite aerodynamic characteristics, can be made to do in-flight maneuvers of various kinds, can be caused to glide over substantial distances, and is relatively easy to master.

Many dog trainers and breeders believe a healthy and beneficial exercise for a dog is retrieving. Not only that, but both dogs and their owners appear to greatly enjoy "playing fetch." The most common image of this mutually pleasurable game is the dog furiously and happily racing after a thrown stick or a rubber ball. Using a flying disc as described above enhances this game, adding a new and exciting dimension to the ancient game between Man and his "Best Friend", since the disc can also be caught in flight.

However, unlike Man, a dog, like many other animals, lacks the opposable thumb of primates, e.g., mankind, which allows for easy grasping of materials. As a result, animals without opposable thumbs, e.g., dogs and cats, usually carry items by grasping them between their jaws. In most situations, this method of grasping is adequate. However, because of the configuration of conventional flying discs, when the disc is lying stationary, flat and upon the ground, i.e. with its underside facing upwardly, it is difficult for the animal to pick up the disc because of its, and the dog often leaves the disc without retrieving it, causing inconvenience to the thrower when he has to retrieve it himself. When the disc lands with its underside facing upwardly, the dog can get a grip thereon with his teeth.

Furthermore, other materials may be incorporated into the construction of the flying disc in order to make it more appealing to the animals, e.g., dogs, and more resistant to wear and tear. For example, a scent or flavor or other sort of attractant may be incorporated into a matrix material forming the device to help the retrieving animal locate the saucer. In addition, these attractants may increase the the animal's desire to retrieve the saucer.

Furthermore, the attractants may be incompatible with the matrix materials used to construct the disc, inhibiting their combination with the matrix material and reducing the amount of attractant present. To help alleviate this problem, the attractant may be layered upon the external surface of the matrix. However, this layer may chip or wear off with continued use.

Hence, those concerned with the development of pet toys have long recognized the need for retrievable toys, e.g., flying saucers, which are easy to grasp while lying on the ground, incorporate additional identification or attractant materials within the flying disc and have greater aerodynamic stability due to gyroscopic effect or other advantages. The present invention fulfills all of these needs.

SUMMARY OF THE INVENTION

Briefly, in general terms, the present invention provides a new and improved throwable toy for easier retrieving by a pet.

Basically, the present invention is directed to a new and improved throwable pet toy fabricated from a matrix which has an attractant incorporated within such matrix, the matrix being composed of a material which resists wear and tear. A toy embodying the present invention may also include a projection which extends from the toy promoting the retrievability of the toy when it is lying flat on the ground, and enchancing its straight line of flight by the gyroscopically calculated distribution of additional mass.

In one presently preferred embodiment of the invention, by way of example and not necesarily by way of limitation, a flexible throwable toy in the shape of a flying saucer is formed of a suitable matrix, for example, polyethylene, polyurethane or nylon. At least one attractant, selected from various meat and meat by-products essences, is uniformly distributed throughout the marginal subsurface of the matrix. The toy may include a projecting ridge, in the form of a bone, which extends upward and outward from the a top surface of the saucer to enhance its gripability by a dog.

These and other objects and advantages of the invention will become apparent from the following more detailed description, when taken in conjunction with the accompanying drawings of the illustrative embodiments.

BRIEF DESCRIPTION OF THE DRAWINGS

FIG. 1 is a perspective view of a throwable pet toy embodying the present invention;

FIG. 2 is an enlarged top plan view of said toy;

FIG. 3 is a front elevational view of said toy;

FIG. 4 is a side elevational view of said toy;

FIG. 5 is a front sectional view taken substantially along line 5—5 of FIG. 2;

FIG. 6 is a side sectional view taken substantially along line 6—6 of FIG. 2;

FIG. 10 is a perspective view showing a throwable toy embodying the present invention being thrown; and FIG. 11 is a perspective view showing a dog gripping a toy embodying the present invention between his jaws.

DETAILED DESCRIPTION OF THE INVENTION

Figure 7:
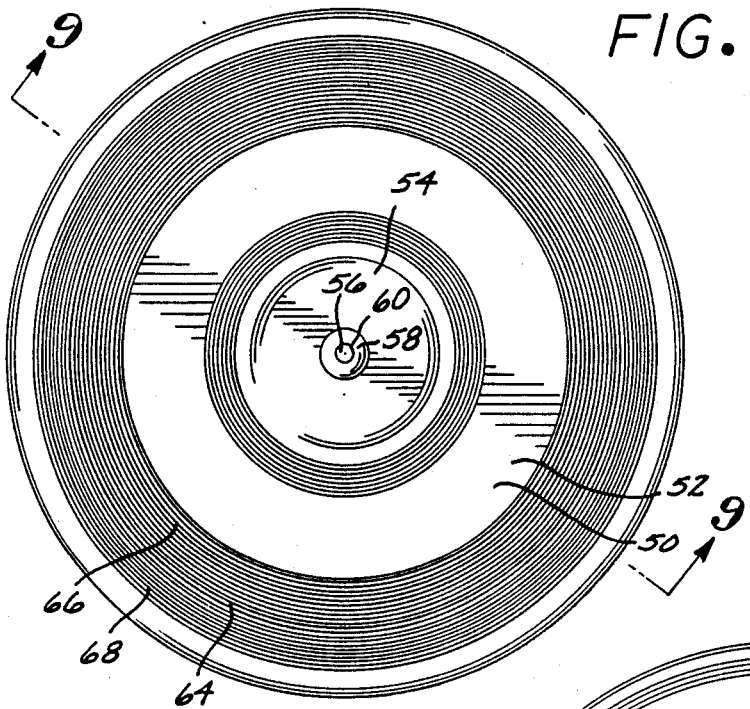
FIG. 7 is a top plan view of a second form of throwable toy embodying the present invention.

Referring to the accompanying drawings for the purposes of illustration, a throwable pet toy of the present invention, generally designated 10, is configured in the shape of a flying saucer which is preferably formed at its upper portion with a projection 11 that facilitates the grasping of the toy by a dog or other pet. In FIG. 10 the toy is shown being thrown by a human H for retrieval by a dog D.

Like reference numerals are used throughout the drawings to indicate elements having substantially similar structure or characteristics.

Referring now to FIGS. 1 and 2, there is shown the throwable pet toy 10 constructed in accordance with the present invention which includes a circular disc, saucer-like or platter implement having a central crown portion 12, an intermediate circular portion 14 and a rim portion 16. The central portion 12, intermediate circular portion 14, and rim 16 together define the top and bottom sides, generally designated 18 and 20 respectively, of the pet toy 10. In addition, a projection, generally designated 11, extends upwardly and outwardly from the top side 18.

As can be observed from FIGS. 3 and 4, the bottom side of the saucer 10, together with its top side 18, presents a profile which roughly approximates a disc of a given thickness having a domed or crown portion raised above and located within the central portion 12 and the inner circumference of intermediate portion 14. A curved surface 26 is provided as a part of the central portion 12 which extends downwardly from the point of maximum elevation of the central portion, generally a flat top surface 27, to an elevation below the point of maximum elevation of the rim portion 16.

Referring now to FIGS. 5 and 6, there is shown the cross-sectional outline of the top side 18 and the underside 20. As can be seen from these figures, the throwable pet toy 10 generally resembles an inverted saucer. Furthermore, rim portion 16, rises upwardly in the curving outline to the region corresponding to the transition between the rim 16 and the outer circumference of intermediate surface portion 14. Alternatively, the curved surface 26 may be described as having the point of maximum elevation of intermediate circular portion 14 limited to a height which is below the point of maximum elevation of the rim portion 16 creating an arcurate trough 28 extending around the pet toy 10. This likewise imposes the limitation that the point of maximum elevation of the intermediate surface 14 is located a predetermined distance below the point of maximum elevation of the crown or dome portion 12 of the pet toy. By this construction, the curved surface 26 is dished such that a reverse or "S" curve is produced in the transition from the rim 16 to the intermediate circular portion 14 and hence to the surface of the central or crown portion 12. This surface of reverse curvature results in the annularly depressed trough 28 extending around the saucer 10, the trough being located immediately to the interior of the rim portion 16. In addition to its contribution to the lowered profile of the saucer, the trough 28 provides a means whereby the saucer may be more readily gripped, particularly when being launched by a human for retrieval by the pet.

When grasped in the conventional launching manner with the top surface up when in flight, the fingers of the human H user grip the underside 20 of the saucer and rim portion 16, while his thumb rests within the trough 28 on the top side 18 thereof. In this way, the user is enabled to maintain firmer physical contact with the toy during launching resulting in greater "push" and thereby achieving long and fast flights with the pet toy 10 of the present invention shown in FIGS. 1-6 and 10.

Note that the rim portion 16 of the toy, which extends downwardly in an essentially perpendicular relation to the general plane of the toy and is substantially thicker than the remaining portions of the toy to strengthen and stiffen the peripheral area of the toy.

Referring again to FIGS. 3-6, there is shown, extending upward and projecting outward from the intermediate circular surface 14 and the central or dome portion 12, the projection 11. The purpose of such projection is to enhance the grasping of the pet toy 10 by the pet by increasing the vertical dimension of the saucer. In this preferred embodiment, the projection 11 is in the shape of a bone of the type sold by pet stores as tooth and gum exercisers for dogs. The projection 11 includes an elongated central ridge 30, which substantially extends across the major portion of the toy's body at the midportion thereof. Ridge 30 includes substantially perpendicular side walls 32 extending upwardly from the central dome portion 12 to terminate in an apical connecting surface 36 spanning or extending between the side walls. The central ridge 30 defines a hollow interior or recess 38 therein.

As shown in the drawings, the central ridge 30 terminates at its first and second ends in a pair of adjacent knobs 40 and 42. In the preferred embodiment, the two adjacent knobs are substantially symmetrically disposed relative the central longitudinal axis of the central ridge 30. Each knob 40 and 42 has a side wall 44 which terminates in a hemispherical apex 46 extending outward relative the top surface 27 of the central dome portion 12, beyond the apical connecting surface 36 of the ridge 30. The knob side walls 44 are generally perpendicular to the top surface of the body of the pet toy 10, e.g., the surface 27 of the crown portion 12, and the annular intermediate circular portion 14, and extend between the top surface 27 at one end and the hemispherical apex 46 at the other. These knobs 40 and 42 project upward from the top surface 27 to the apex 46, a distance at least as great as the vertical dimension of the central crown portion 12 relative the bottom edge 24. For example, in one preferred embodiment of the present invention, the apex 46 may extend upward about one and one-eighth inches relative to the top surface of the rim portion 16 and about seven-eighths of an inch relative the top surface 27 of the crown portion 12.

Referring now to FIG. 6, the elongated ridge 30 extends between substantially opposite portions of the rim 16. The projection 11 thus extends radially outward beyond the central portion 12 towards the rim portion 16 adjacent the trough 28, to terminate in the pair of adjacent knobs 40 and 42 at the first and second ends.

By this construction, the projecting ridge 11 substantially increases the vertical dimension of the throwable pet toy 10 to provide a shape which is easily grasped by the jaws of an animal. Thus, unlike the structural arrangements of conventional throwing discs, the projection 11 can be grasped easily by the pet for retrieval when the disc lands with its top side up. The projection 11 also enhances the gyroscopic effect of pet toy due to its increased weight as compared to a conventional FRISBEE-type toy.

Figure 8:
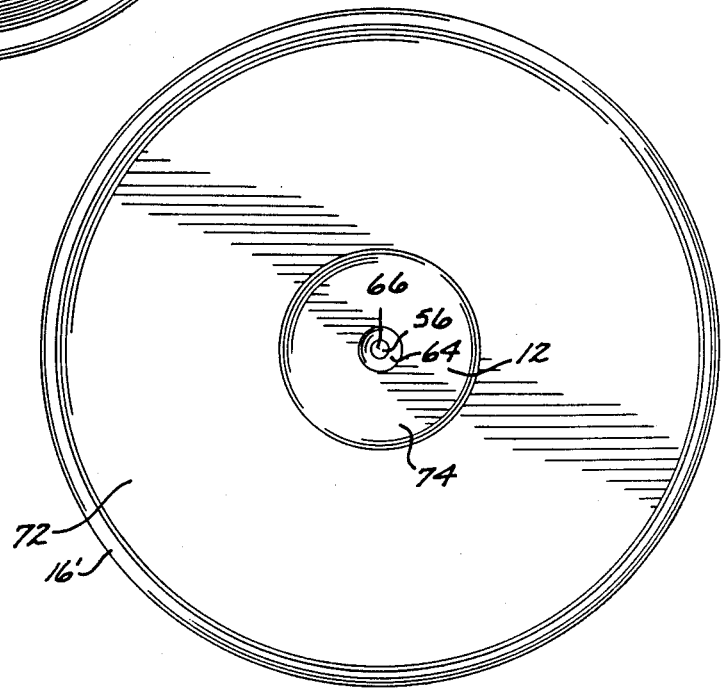
FIG. 8 is a bottom view of the embodiment of FIG. 7.
Figure 9:
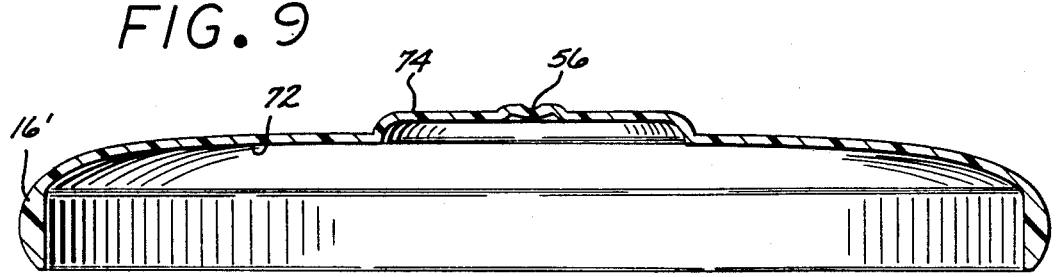
FIG. 9 is a side elevational sectional view taken substantially along line 9—9 of FIG. 7.

FIGS. 7-9, illustrate an alternate embodiment of the throwable pet toy 10 of the present invention. In this embodiment, the pet toy 10 resembles that of FIGS. 1-6, with the exception that there is no projection 11 incorporated therein. Referring to FIG. 7, the concentric raised intermediate portion 50 includes an upwardly extending arcuate surface 52 which extends between the rim portion 16' to the central crown portion 54. In contrast to the previous embodiments illustrated in FIGS. 1-6, the arcuate surface 52 may not form a trough 28 therein.

In addition, discontinuity in the top surface of the throwable pet toy 10, in the form of a circular shallow recess 56, is located interiorly of the annular connecting member 58 in the center of crown portion 54 and forms a closed circle thereon, concentric with the center 60 of the saucer 10. The central region of crown portion 54 in such an embodiment, is thereby essentially flat.

As shown in FIG. 7, a plurality of concentric closely spaced ribs or ridges 64 may be superimposed or raised from the intermediate circular portion 68 and extend a predetermined distance up surface 68 of crown portion 54. The ridges 64 produce an air spoiling effect and a turbulent, closely adhering boundary layer flow of air over a greater portion of the top surface of the throwable pet toy 10 before separation in comparison to the flow over a smooth surface, resulting in an increased stability in flight of the throwable pet toy 10. The exterior most spoiler rib is located at or slightly interiorly to the point of juncture of the rim 16' and intermediate circular portion 66, with the remaining spoilers extending interiorly thereof.

As shown in FIGS. 8 and 9, the underside side of the throwable pet toy 10 has an essentially smooth surface 72 extending from the rim portion 16' interiorly to recess 56. The recess 56 appears as a circular disc 74 raised from the surface of the top side 20 of the saucer 10.

In its presently preferred embodiment, the throwable pet toy 10 of the present invention is fabricated by using a suitable matrix, e.g., a damage or mastication resistant material, e.g., an injection molding of polyethylene, polyurethane or nylon. Fabrication in this manner from such a material results in a flying pet toy having the degree of rigidity necessary for shape retention while retaining a limited degree of softness and flexibility to enhance its handling and to reduce the shock of impact when used in a toss game between humans H and/or their pets D. For example, the preferred type of nylon, nylon 6, is formed by the condensation polymerization of adipic acid and hexamethylene diamine. Such nylon saucers are strong, resistent to abrasion, absorbent, and non-toxic. Satisfactory nylon material may be obtained commercially from DuPont Chemical Company of Wilmington, Dela.

In addition, the skin of the suitable matrix is preferably uniformly, thoroughly and/or completely impregnated with at least one attractant material or compound. If the throwable pet toy 10 is formed of nylon, as more fully described in the inventor's U.S. Pat. No. 3,871,334, the preferred polymer has a moisture absorbency at ambient conditions from 0.5 to about 5.0 weight percent, preferably from 0.75 to about 2.5 weight percent. Nylons are polyamides which are formed by the condensation of polyfunctional carboxylic acids and polyfunctional amines, e.g., the condensation of adipic acid and hexamethylene diamine. The close similarity of molecular structure of the repeating units of the polyamides to natural proteins, which are the odor and flavor components, provides a very high affinity between the polyamide and such odor and flavor components. This greatly reduces the volatility of the latter to such a degree that they are not readily detectable by humans although still remaining attractive and pleasing to animals when absorbed in the polyamide substrate. These polymers are readily available as molding powders and can be readily molded into the desired shapes and sizes suitable for throwable pet toys.

The aforementioned pet toy 10 is impregnated with flavor and odor components which are obtained from meat and animal by-products, e.g., ham, beef, or chicken essences. The flavor and odor components are condensed and absorbed into a liquid impregnating solution which is maintained out of direct contact with the meat and animal by-products during a pressure cooking operation. This is achieved by suspending the meat and animal by-products in a vapor phase of a pressure vessel which contains a pool of water. The vessel is closed and heated to a temperature from 210° to about 290° F., developing an autogenous pressure from 15 to about 60 psia and the meat/animal by-products are cooked in the resultant steam atmosphere generated within the pressure vessel. Preferably, pressures from about 20 to about 40 psia are employed with cooking temperatures from 228° to about 260° F. The volatile flavor and odor components, which are expelled from the meat and animal by-products during this operation, are condensed into the aqueous liquid within the pressure vessel. The aqueous liquid in the pressure vessel, therefore, comprises a liquid solution of flavor and odor components which is entirely free of any suspended solids or liquids such as meat particles and fat globules. This aqueous liquid may also be concentrated by evaporation and re-used.

If polyurethane is used, the preferred type is described in more detail in the inventor's co-pending patent, U.S. patent application Ser. No. 908,220, filed Sept. 17, 1986, which is hereby incorporated by reference in its entirety. The preferred type of polyurethane is a polyester polyurethane and, more particularly, the reaction product of a polycarboxylic acid such as adipic acid and a polyfunctional isocyanate such as methylene diphenyl diisocyanate. A very desirable material is a polyurethane elastomer sold by the Dow Chemical Company under the trademark "PELLETHANE" and particularly the polyurethane having the product identification of "PELLETHANE 2355-75A". This latter product is the reaction product of adipic acid and methylene diphenyl diisocyanate. It has excellent flexibility for chewing and yet has sufficient strength and toughness so that the material can withstand highly active mastication thereof by large animals.

The polyurethane body formed of the preferred matrix material or composition may absorb sufficient amounts of an aqueous-based flavor or odor extract (about 0.5 to about 2% by weight, preferably about 0.75 to about 1.5% by weight) so that the object is attractive to animals, e.g., dogs, but such absorption does not significantly degrade the physical or mechanical properties of the polyurethane material. Moreover, the extract does not bleed to the surface of the product, does not rub off and cannot be tasted or smelled by humans.

It should be recognized that modifications can be made to the polyurethane composition such as by adjusting the ratio of reaction components or modifying the individual components in order to develop specific properties for particular end uses. Preferably, flavor or odor extracts for pets are from meat or animal by-products, e.g., smoked ham, chicken, beef and other meat by-products such as ham hocks, shank ends, turkey, or chicken necks/backs and oxtails. It is to be recognized, however, that flavors or odors such as candy or catnip may be incorporated into the body of other end users, such as children or cats.

The preferred process for incorporating water-based flavor or odor extracts generally follows the procedures described in U.S. Pat. No. 3,871,734 which is hereby incorporated in its entirety by reference. However, it has been found that with the present invention it is not necessary to treat polyurethane bodies with the aqueous based flavor or odor extract for the length of time described in the aforesaid reference to treat nylon products, i.e., three to twenty hours. Generally, it is found that treatment times less than about two hours are effective for polyurethane products. A typical amount of aqueous base extract found to be effective is about 1%.

Also, it should be noted that the attractant material need only be uniformly dispersed throughout the surfaces of the matrix, and not the interior sections of the matrix, thereby lowering the manufacturing cost of the pet toy.

In its presently preferred embodiment the throwable pet toy 10 incorporating the projection 11 has a weight of between about 80 and about 100 grams and a diameter of approximately 9¼ inches. Larger and smaller versions of the presently preferred embodiment are also contemplated having proportional weight and dimensional characteristics.

In operation, as shown in FIG. 10, the human H, after gripping the flying pet toy 10, as more fully described elsewhere in this application, flings or throws the toy outward, e.g., towards the pet D. As best observed in FIG. 11, the attractant, being uniformly distributed throughout the surface of the suitable matrix, generally resistant to mastication, helps the animal locate the pet toy and increases the motivation of the animal to retrieve it. The embodiment which includes the projection 11 is easy to grasp when the pet toy lands with its top side facing upwardly and enhances the retrievability of the pet toy 10.

It will be apparent from the foregoing that, while particular forms of the invention have been illustrated and described, various modifications can be made without departing from the spirit and scope of the invention.

Accordingly, it is not intended that the invention be limited, except as by the appended claims.

What is claimed is:

1. A flying pet toy adapted to be thrown by a human through the air for retrieval by an animal, said pet toy comprising:
   a circular crown portion having a center, an intermediate circular surface portion surrounding said crown portion, and a circumferential rim portion surrounding the circular surface portion;
   an animal attractant material impregnated in the material of the toy;
   a radially extending upward projection formed across said crown and intermediate circular surface portions having vertically extending parallel side walls which terminate in a generally horizontally extending connecting surfaces that span the upper end of said side walls, said projection extending across the major portion of the pet toy at the mid-portion thereof, with said projection simulating a bone to provide a shape which can be readily grasped by the animal for retrieval and said projection also enhancing a gyroscopic effect of the pet toy.

2. A flying pet toy as set forth in claim 1, wherein the circumferential portion is formed with an annularly depressed trough that receives the thumb of said human when the toy is thrown.

3. A flying pet toy adapted to be thrown by a human through the air for retrieval by an animal, said pet toy comprising:
   a circular crown portion having a center, an intermediate circular surface portion surrounding said crown portion, and a circumferential rim portion surrounding the circular surface portion;
   a radially extending hollow, projection having an elongated central ridge which substantially extends across the major portion of the toy and includes substantially perpendicular side walls extending upwardly from the center of the crown portion to terminate in an apical connecting surface extending between said side walls, with said central ridge terminating at the ends in a pair of knobs that project upwardly from said central ridge,
   with said projection simulating a bone to provide a shape which can be readily grasped by the animal for retrieval and said projection also enhancing the gyroscopic effect of the pet toy; and
   an annularly depressed trough formed in the circumferential portion that receives the thumb of said human when the toy is thrown.

4. A flying pet toy as set forth in claim 3, wherein an animal attractant material is impregnated in the material of the toy.

* * * * *